(12) United States Patent
Trenkovic et al.

(10) Patent No.: US 12,021,927 B2
(45) Date of Patent: Jun. 25, 2024

(54) LOCATION BASED VIDEO DATA TRANSMISSION

(71) Applicant: Arcus Holding A/S, Brøndby (DK)

(72) Inventors: Matija Trenkovic, Irvine, CA (US); Benjamin Player Rowe, Irvine, CA (US)

(73) Assignee: Arcus Holding A/S, Brøndby (DK)

( * ) Notice: Subject to any disclaimer, the term of this patent is extended or adjusted under 35 U.S.C. 154(b) by 0 days.

(21) Appl. No.: 18/300,195

(22) Filed: Apr. 13, 2023

(65) Prior Publication Data

US 2023/0336625 A1 Oct. 19, 2023

Related U.S. Application Data

(60) Provisional application No. 63/331,635, filed on Apr. 15, 2022.

(51) Int. Cl.
| | |
|---|---|
| *H04L 67/1097* | (2022.01) |
| *G06F 16/14* | (2019.01) |
| *G08B 13/196* | (2006.01) |
| *H04N 7/18* | (2006.01) |

(52) U.S. Cl.
CPC ......... *H04L 67/1097* (2013.01); *G06F 16/14* (2019.01); *G08B 13/19665* (2013.01); *H04N 7/181* (2013.01)

(58) Field of Classification Search
CPC .............. G06F 16/14; G08B 13/19665; H04L 67/1097; H04N 7/181
See application file for complete search history.

(56) References Cited

U.S. PATENT DOCUMENTS

| | | | | |
|---|---|---|---|---|
| 8,026,945 | B2* | 9/2011 | Garoutte | H04N 5/76 348/208.1 |
| 8,872,940 | B2* | 10/2014 | Marman | H04N 5/772 348/231.3 |
| 11,138,847 | B2* | 10/2021 | Renkis | G08B 13/19695 |
| 11,310,550 | B2* | 4/2022 | Chung | H04L 67/1097 |
| 2015/0312341 | A1* | 10/2015 | Smith | H04N 5/781 709/213 |
| 2019/0190844 | A1* | 6/2019 | Resch | G06F 3/0623 |
| 2020/0145685 | A1* | 5/2020 | Gondo | H04N 19/50 |
| 2023/0045876 | A1* | 2/2023 | Zheng | G06F 16/743 |

* cited by examiner

*Primary Examiner* — Thomas J Dailey
(74) *Attorney, Agent, or Firm* — Canon U.S.A., Inc. IP Division (57) ABSTRACT

A method for retrieving data and transmitting the data upon receiving a client request, wherein the data is from a video surveillance system and encoded into groups of pictures, each group of pictures being assigned at least one identifier and/or at least one timestamp. Receiving a request for the data from a client device, wherein the data request from the client device is associated with at least one identifier and/or at least one timestamp. Retrieving a metadata object including a group of pictures and indicating at least two storage options where the data is retrievable, the metadata object being retrieved based on the at least one identifier and/or at least one timestamp. Assigning a rank for the data stored in a first storage option and for the data stored in a second storage option and transmitting the data from a storage option with the greater rank to the client device.

15 Claims, 7 Drawing Sheets

⬛ Video Metadata — 80

- Int Timestamp: (Video Start Time)
- Int Duration: (Video Duration)
- Int Size: (Video Object Size)
- Int Offset: (Video Object Byte Offset)
- String MotionLevel: (Used for Ranking)
- String MotionFlag: (Used for Ranking)
- String LocationType: (Location Type - Used for Ranking)
- String LocationURL: (ID to the Storage Object or Custom Protocol)

LOCATION BASED VIDEO DATA TRANSMISSION

CROSS-REFERENCE TO RELATED APPLICATIONS

This application relates, and claims priority, to U.S. Provisional Application Ser. No. 63/331,635 filed Apr. 15, 2022, which is hereby incorporated by reference herein in its entirety.

FIELD OF THE DISCLOSURE

The present disclosure relates in general to a location based video data delivery method, and more particularly, to a method of storing a separated video index for efficiently determining where video data is closest to a client for transmission purposes to playback video content.

BACKGROUND

Description of the Related Art

Video monitoring has significantly increased with the proliferation of recording devices, especially in the fields of video surveillance and network security. Traditionally, video data is retrieved and synchronized from the server side, which may, introduce choke points that make it more difficult to achieve scalability. Existing systems used to retrieve video data typically do not take into account an understanding of where the video data is stored or how the data should be retrieved. Instead, existing web technologies focus toward optimization of delivery for one to many scenarios where the client requesting the data makes a decision typically based on bandwidth.

In the security industry a unique case arises where video data storage is disparate and redundant across multiple systems and technologies. Data needs to be secure and accessed on demand without compromising the user experience. Traditional video platforms utilize Content Delivery Networks (CDN's) to distribute data and ensure resilience and speed. CDN's are not recommended within the security industry because the security industry does not operate on a one to many delivery model. There are also privacy and compliance concerns around the CDN approach.

Existing streaming technologies like HLS and MPEG-DASH focus on the "last-mile" delivery of video data to the client, by taking into account the client's bandwidth capabilities, as well as current network availability using quality of service (QoS) technologies. These streaming technologies do not take into account the physical locations of the video data, and are unable to take decisions on the projected video latency or take decisions on potential privacy or compliance policies that might require playing back video, that are transparent to the end user.

The existing technologies used for adaptive video streaming also typically have data stored in a single storage technology (CDN for example), which might have redundant data in multiple physical locations, but is unable to support video retrieval from multiple disparate storage systems and custom protocols, or take decisions on these parameters.

Existing technologies are also reliant on heavy video data pre-processing to ensure adaptive streaming. For example, in DASH, video data needs to be transcoded into multiple different resolutions in order to support adaptive streaming, which inherently increases the latency of video availability for the customer. This is typically acceptable in streaming services like YouTube or Netflix where video playback is heavily pre-processed, and then made available to the user. This is not typically acceptable in the surveillance industry, as video data must be available in a short period, for fast access of the security operators.

Thus, there is a need in the art to improve video retrieval technologies, in order to support low-latency seamless video playback, from an array of different storage technologies, ensuring privacy and other data compliance security that might be based on customer and/or government policies. There is a need in the art to support continuous and transparent video playback to the user or users. There is also a need in the art for an improved video indexing method that ensures fast delivery and look-up of video related data and a method configured to determine where video data is located prior to sending requests to avoid issues involving hardware devices with disparate and low connectivity.

SUMMARY

The present disclosure is directed to a method for video indexing that stores a separated index to allow for faster data retrieval by determining where data is closest to a client requesting the data. The video indexing method enables clients to retrieve data directly from multiple sources. The video indexing method supports multiple data types and storage locations. By utilizing the video indexing method, a 50-200 millisecond (ms) speed boost is achievable for retrieving binary large object (BLOB) and searching of data compared with using pure storage.

A method for retrieving data and transmitting the data upon receiving a client request, wherein the data is originally from a video surveillance system and encoded into groups of pictures (GOPs), each group of pictures (GOP) being assigned at least one identifier and/or at least one timestamp, the method includes receiving a request for the data from a client device, wherein the data request from the client device is associated with at least one identifier and/or at least one timestamp. The method also includes retrieving a metadata object including a GOP and indicating at least two storage options where the data is retrievable, the metadata object being retrieved based on the at least one identifier and/or at least one timestamp associated with the data request. A rank is assigned for both the data stored in a first storage option and the data stored in a second storage option, determining whether the data stored in the first storage option has a greater rank than the data stored in the second storage option, retrieving the data from the first storage option when it is determined that the first storage option has a greater rank and retrieving the data from the second storage option if the rank for the data stored in the first storage option is less than the rank for the data stored in the second storage option. The method may conclude by transmitting the data from a storage option with the greater rank to the client device.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

The present disclosure has several embodiments. With reference to the drawings, a method for location based video data delivery using video indexing is described according to an embodiment of the present disclosure. The video indexing method relies on a metadata indexing system that is used to abstract access to media files, which may be stored in disparate storage technologies. Using a pluggable storage architecture, data retrieval can, transparently to the user, deliver data by prioritizing different storage technologies, based on an estimated retrieval time, as well as using additional metadata around the video to optimize video delivery to clients.

Figure 1:
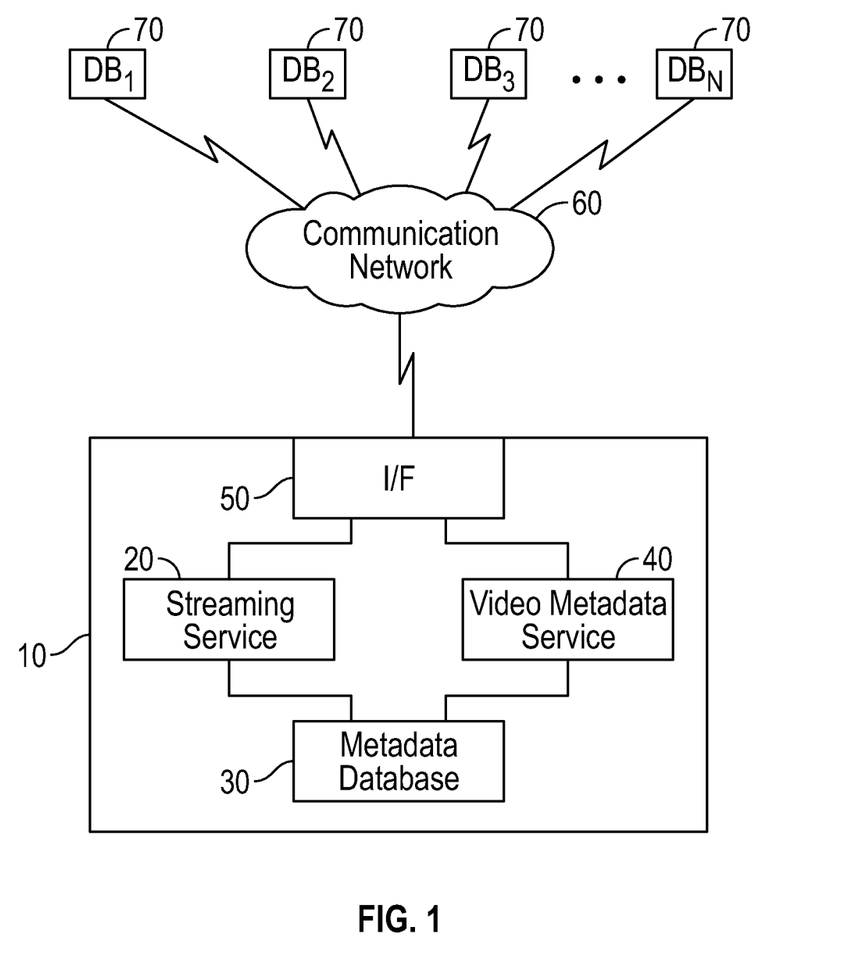
FIG. 1 schematically illustrates an example of a video management system for fast data retrieval.

FIG. 1 schematically illustrates an example of a video management system 10 for location based video data delivery. The video management system 10 may include or communicate with a streaming service 20, a media database 30 and a video metadata service 40. One or all of the services and the media database 30 may function as a separated video index for efficiently determining where video data is closest to a client for transmission purposes to playback video content. The video management system 10 may include a client video player that handles the retrieval of data via the streaming service 20. The streaming service 20 of the video management system 10 may include a server (not shown) or may be in communication with the server for its source of video. The streaming service 20 is a software component that deals with the data transmission between a client device and a server, and transforms the data to a format that a source buffer understands such as HTML 5 Source Buffer by way of example. Additionally, the streaming service 20 produces a video metadata object. The streaming service 20 is also connected to the HTML5 video element via a Media Source Extensions API. The streaming service 20 is also configured to handle data transmission between multiple client devices and server devices.

The streaming service 20 has two main functions. The streaming service 20 communicates with the streaming backend (server). The streaming service 20 requests chunks of video and then processes those chunks. Additionally, the streaming service 20 generates a video metadata object that is central to storing the separated video index, supporting multiple data types and storage locations as well as enabling clients to retrieve data directly from multiple sources in accordance with the present disclosure.

The media database 30 may store the received video streams and is configured to access live video streams and/or GOPs thereof. The media database 30 is in communication with the streaming service 20. The media database 30 may include a suitable storage device for storing media content. The media database 30 may be embodied as a software program module executed by a suitable data processing system, e.g. by one or more server computers. The media database 30 may be configured to receive input video streams originating from video cameras. The media database 30 may be part of the video management system 10 or it may be separate from, but communicatively coupled to the video management system 10. The media database 30 may be implemented as any suitable mass storage device, such as one or more hard disks or the like. The media database 30 may receive additional input signals, such as audio signals, motion detection signals, etc. associated with the input video streams. The additional input signals may originate from video cameras and/or from other signal sources, such as from additional surveillance sensors. The video management system 10 may store the additional input signals in the media database 30 and/or in a separate storage device.

The video management system 10 may store generated video metadata in a suitable video metadata service 40, which may be separate from or integrated into the media database 30. The video metadata service 40 may be embodied as a software program module executed by a suitable data processing system, e.g. by one or more server computers. The video metadata service 40 may receive metadata and store the received metadata. The video metadata service 40 may further index the stored metadata to allow faster subsequent search and retrieval of stored metadata. The video metadata service 40 is configured to communicate with the streaming service 20 and the media database 30. The video metadata service 40 communicates with the media database 30 for indexing the video metadata stored in the media database 30. Accordingly efficient subsequent retrieval of the stored metadata is facilitated.

The media database 30 is further configured to selectively provide live input video streams and/or previously stored input video streams and/or GOPs thereof via an interface 50. The interface 50 may provide a network interface for providing live video streams and/or previously stored video streams and/or GOPs thereof via a communication network 60. The interface 50 uses the communication network 60 to communicate with a plurality of storage devices 70. The present disclosure refers to a video data retrieval method where at least two storage devices exist ($DB_1$ & $DB_2$). However, the number of storage devices is not limited as shown by $DB_N$. The storage devices 70 may also be referred to as databases for storing network surveillance videos. The storage devices 70 may include cloud-based digital devices and/or customer storage devices. The storage devices 70 may vary from customer to customer as well as different cloud based technologies. The interface 50 may be configured to establish respective video tunnels and/or other communication sessions with the storage devices 70. The media database 30 retrieves a previously stored video stream and forwards the retrieved video stream and/or GOPs thereof via interface 50 to a digital device associated with a client or clients that request video data at a particular time or range of time. The interface 50 communicates with the storage devices 70 via the communication network 60 to retrieve video data requested from a client device.

The storage devices 70 may include any combination of cloud storage devices, hard drive storage and customer gateway devices by way of example. Some of the storage devices 70 may include camera drivers, video analytics systems and other video-receiving systems by way of example. It should be noted that the some of the storage devices 70 may include digital devices that may be separate client devices operating various video surveillance systems. The storage devices 70 may be configured to receive video signals from a video surveillance system (not shown) that includes multiple cameras via a local area network.

While the storage devices 70 may communicate with a video surveillance system that includes one or a plurality of video cameras. Many examples of video surveillance systems may include cameras of different types, e.g. video cameras having different capabilities, providing video streams of different resolutions, in different formats or outputting additional metadata associated with the video. Examples of capabilities of video cameras may include one or more of the following: audio recording, video recording in visible wavelength ranges and/or in infrared wavelength ranges, such as near-infrared wavelength ranges, control functions such as pan or zoom, image processing capabilities, motion detection, etc.

The storage devices 70 are communicatively connected to the video management system 10 via the communication network 60 by way of example. Other suitable communication include, e.g. via point-to-point wired and/or wireless connections, or the like. An example of a wireless connection includes a 5G network. It will be appreciated that some examples of video surveillance systems may include additional sensors providing sensor signals and/or media streams different from video streams, such as audio signals, radar signals, etc. The ability for the video management system 10 to communicate with the storage devices 70 supports video retrieval from multiple disparate storage systems.

The video management system 10 may be embodied as a software program executed by a suitable data processing system, e.g. by one or more server computers. The storage devices 70 may comprise one or more camera drivers for providing interfaces to respective types of video cameras. Different video cameras may provide their video streams and/or GOPs thereof in different formats, e.g. using different encoding schemes and/or different network protocols. Similarly, different cameras may provide different interfaces for camera control such as zoom, or pan. Accordingly, the storage devices 70 may include a plurality of different camera drivers configured to cooperate with respective camera types. In particular, the camera drivers may implement one or more suitable network protocols and/or other communication standards for communicating with video cameras and/or other surveillance equipment. Examples of such protocols and standards include the Open Network Video Interface Forum (ONVIF) standard and the Real Time Streaming Protocol (RTSP).

The camera drivers further add one or more time stamps to the received video signals so as to ensure that the video streams, and/or GOPs thereof, which are stored and subsequently supplied by the video management system 10, include uniform timestamps. A timestamp is indicative of the time of receipt, by the video management system 10, of the video streams from the respective video cameras. The camera drivers thus provide uniformly time-stamped input video streams, each time-stamped input video stream corresponding to a respective one of the received video streams.

The storage devices 70 may receive video streams and/or GOPs thereof and provide functionality for viewing and/or processing the video streams and/or GOPs thereof. The storage devices 70 may also perform video processing for analysing the video streams and/or GOPs thereof. To this end, the video analytics associated with the storage devices 70 may perform object detection, object recognition, motion detection and/or other types of video analytics. The storage devices 70 may create video metadata indicative of the results of the video analytics performed. For example, the video analytics may create video metadata indicative of recognized objects in a video stream and/or in a GOP. The metadata may include information about the spatial and temporal positions of recognized objects in the video stream and/or in a GOP and/or information about the identity of the recognized object. The analytics systems may store the generated metadata in the video metadata service 40 of the video management system 10.

The communication network 60 may be the internet or another suitable communication network. It will be appreciated, however, that at least some of the storage devices 70 may reside on the same data processing system as the video management system 10 or on a data processing system connected to the video management system 10 via a local area network.

To summarize, the video management system 10 of the present disclosure may use any combination of the streaming service 20, media database 30 and video metadata service 40 for video indexing of GOPs received or stored on the storage devices 70 or video surveillance systems. The video management system 10 enables storing a separated video metadata index to allow for faster data retrieval by determining where data is closest to a client requesting the data. For example, if it is determined that $DB_1$ is closer to a particular client than $DB_2$, the video management system 10 will retrieve the data from $DB_1$ to transmit to the client. The video indexing method enables clients to retrieve data directly from multiple sources using the video management system 10. The video indexing method supports multiple data types and storage locations. By utilizing the video indexing method, a 50-200 millisecond (ms) speed boost is achievable for retrieving binary large object (BLOB) and searching of data compared with using pure storage.

Figure 2:
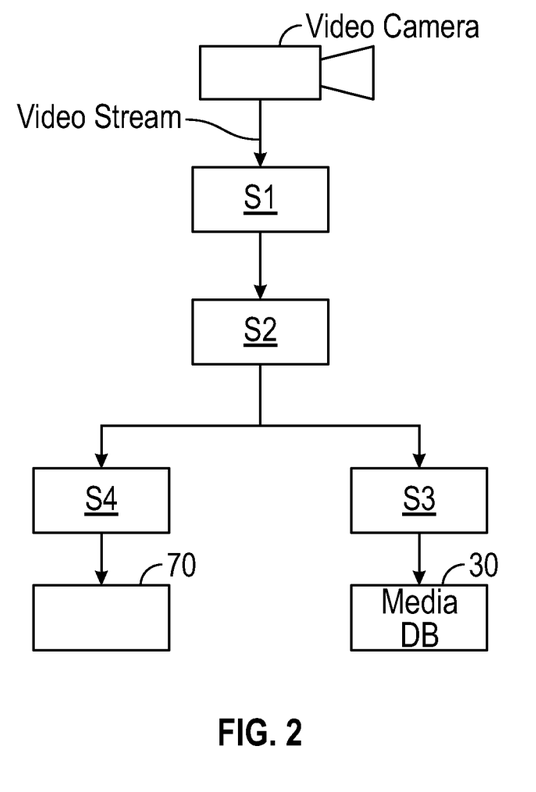
FIG. 2 schematically illustrates an example of a computer-implemented video management process.

FIG. 2 schematically illustrates an example of a computer-implemented video management process. The process of FIG. 2 is performed by the video management system 10. In step S1, the process receives a video stream from a video camera. While this example uses a single video stream from a video camera the process may be extrapolated to a plurality of video streams from a plurality of video cameras.

In step S2, the process adds a time stamp to the received video stream, the time stamp being indicative of the time of receipt of the video stream by the video management system 10, thus resulting in a time-stamped input video stream. It will be appreciated that the process may add multiple timestamps to a received video stream, e.g. so as to indicate the time of receipt of individual parts and/or GOPs thereof, e.g. individual frames of the video stream or e.g. individual GOPs. In some embodiments, time stamps are added to some but not all frames, e.g. only to an initial frame and/or to one or more otherwise selected frames. It will further be appreciated that, depending on the type of camera, the received video stream may or may not include timestamps.

However, regardless of the presence of any timestamps in the received video stream, the added timestamps of the input video stream and/or GOPs thereof will subsequently be used by the video management system 10.

In step S3, the process stores the timestamped input video stream and/or timestamped GOPs in the media database 30.

In step S4, concurrently to the storage of the time-stamped input video stream, the process provides the time-stamped input video stream as a live video and/or as GOPs thereof to one or more of the storage devices 70.

It will be appreciated that some embodiments of the video management system 10 may be capable of concurrently receiving and processing multiple video streams, e.g. video streams from different video cameras, and/or GOPs thereof.

According to an embodiment, the video stream is divided into suitable chunks and sent to multiple video analytics applications (and also preferably sent to multiple machines) which can perform the analytics in parallel, that is to say, at least in part at the same time. Using the H.264 GOP as video chunk size, for example, is a good choice since each chunk is self-contained and can be decoded fully into video frames to be analyzed. Analytics results may then be returned to a central point using the timestamps or other identifiers of the decoded frames (or GOPs) so that a one to one correspondence between (e.g. forensic) video frames and analytics results can be set. Alternatively, each GOP may only have one or two timestamps (i.e. a timestamp for the first frame of the GOP or timestamps for the first and last frames of the GOP) and a correspondence between the video frames and the analytics results can be established on the basis of a known frame number (of a frame between the first and last frames of the GOP) and a known frame rate (e.g. 30 fps) within a GOP. In other words, it is possible to identify each frame within a GOP by a timestamp and/or a frame number, or any other (appropriate) identifier.

According to an embodiment of the video management system 10, the video metadata received by the video management system 10 are associated with respective groups of pictures and/or with respective video streams, based on matching identifiers and/or timestamps between the received metadata and the respective groups of pictures.

According to an embodiment of the computer-implemented video management process, the process comprises using the video management system 10 to associate the video metadata received from the storage devices 70 with respective groups of pictures and/or with respective video streams, based on matching identifiers and/or timestamps between the received video metadata and the respective groups of pictures.

In the present example, as the transmitted video stream and/or GOPs thereof correspond to a previously stored video stream, the video stream retrieved from the media database 30 is date stamped according to the time of recording of the video stream. The media database 30, streaming service 20 and/or video metadata service 40 may forward the retrieved video stream and/or GOPs thereof to the storage devices 70 with the original canonical date stamp. Alternatively, the streaming service 20 and/or video metadata service 40 may replace the canonical date stamp with another, modified time stamp corresponding to the current time at which the media database 30 forwards the previously stored video stream and/or GOPs thereof. Accordingly, in the latter case, at least one database from the storage devices 70 receives at least one video stream and/or GOPs thereof that emulates a live video stream that is currently captured by at least one physical video camera.

In some embodiments, the video management system 10 is configured to send GOPs of the input video streams to one or more remote digital devices, and to concurrently store the input video streams in the media database 30. The storage devices 70 may receive and process any received GOPs in quasi-real time as one or more live video feeds. Accordingly, the video metadata generated by each database from the storage devices 70 may be fed into a video-receiving system in quasi real-time, e.g. for quasi-real-time or live viewing by an operator.

The storage devices 70 as well as the video management system 10 may comprise a processing unit and memory having stored thereon program code configured, when executed by the processing unit, to implement the digital device. It may be appreciated that a single digital device data processing system may implement one or more digital devices. Similarly, it will be appreciated that different digital devices may be implemented by a single data processing system or by respective, separate digital device data processing systems. The one or more digital device data processing systems may thus be communicatively connected to the video management system 10 e.g. via a computer network. In some embodiments, one or more cloud-based digital devices may be implemented by one or more virtual machines, e.g. in a cloud architecture. The present disclosure refers to application programs being deployed on the digital device or being executed by the digital device. It will be appreciated that this is intended to refer to the application program being executed by the digital device data processing system implementing the digital device, e.g. by a cloud computing architecture on which a cloud-based digital device is executed.

Figure 3:
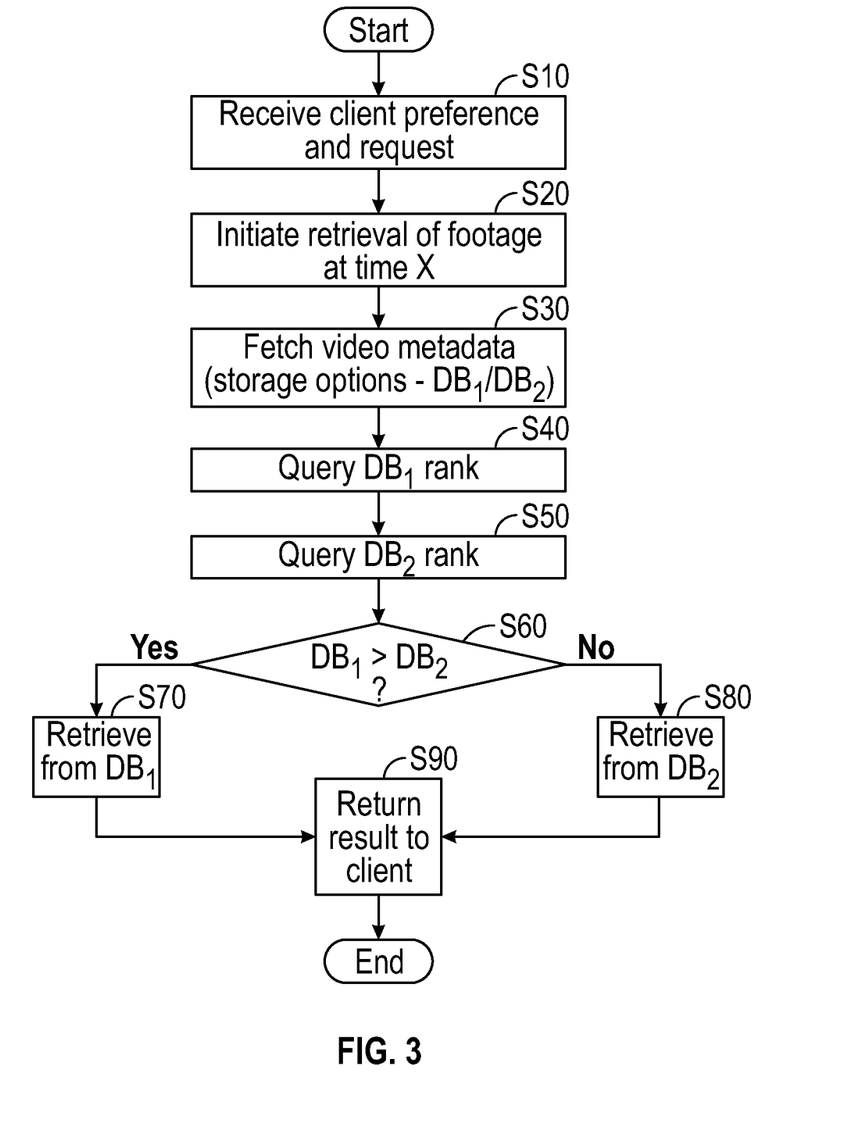
FIG. 3 is a flowchart illustrating a method for retrieving video data using a location based delivery method in accordance with one embodiment of the present disclosure.

Referring now to FIG. 3, a flowchart illustrating various steps for retrieving video data based on a database storage rank is shown. The first step S10 includes the video management system 10 receiving a client request for video data. The client requests video data in order to playback video on a client device. The client may use a user interface such as a web browser on a client device to transmit a client video request to the streaming service 20 of the video management system 10. The client device may be a personal computer (PC), tablet, mobile phone or any device configured to run a software application including a video player. The client device is also configured to interface with a network or the Internet to communicate with the streaming service 20.

After receiving the client video request in step S10, the streaming service 20 initiates retrieval of the video data (video footage) at a time X in step S20. The time X is dependent on the particular video data that is requested by the client via the user interface. Subsequently in step S30, the streaming service 20 retrieves the video metadata that is stored in the video metadata service 40. Upon retrieving the video metadata in step S30, the streaming service 20 determines how many storage options exist for the requested video data. The quantity of storage options may correspond to the number of databases of the storage devices 70. In the example provided in this flowchart, there are two storage options. The first storage option may be referred to as database 1 ($DB_1$) and the second storage option is referred to as database 2 ($DB_2$). The requested video data is stored on both $DB_1$ and $DB_2$. $DB_1$ may refer to a cloud storage option while $DB_2$ refers to a customer storage option such as a server, hard drive or customer gateway device by way of example. However, the example of two storage options are not meant to limit the amount of storage options available. The present disclosure does not limit the available storage options that may exist for retrieving the video data. The cloud storage options include Google Cloud Bucket or Amazon cloud storage by way of example.

After the video metadata is retrieved in step S30, the databases DB$_1$ and DB$_2$ are assigned a rank in steps S40 and S50. It is important to note that if there are three or more databases, each database is assigned a rank. The rank determines the most efficient path for retrieving the video data based on various metrics such as client devices having different connections, type of connectivity and location by way of example. Next, in step S60, it is determined which database has the greater rank. If the rank of DB$_1$ is greater than the rank of DB$_2$, then the method proceeds to step S70 of retrieving the video data from DB$_1$. Alternatively, if it is determined that the rank of DB$_1$ is not greater than the rank of DB$_2$, then the method proceeds to step S80 of retrieving the video data from DB$_2$. Subsequent to the determination of which database has the greater rank, the video footage retrieved from the database with the greater rank is returned to the client in step S90 for the client to view the video data on the client device.

The ranking according to one aspect of the present disclosure is dependent upon location of the video data. For example, if the video data is located in a cloud storage option, that data may be assigned a greater rank because the ability to retrieve the video data from a cloud storage option may be faster and more efficient. A customer storage option such as an edge device like a customer gateway may be assigned a rank that is lower than that for the cloud storage option by way of example. Alternatively, if the client has a preference for retrieving data from the customer storage option instead of the cloud storage option, the ranking may be changed to assign a greater value to the customer storage option. In another embodiment of the present disclosure, the ranking is determined based on motion level. The motion level in the video data determines the ranking, which makes it more efficient to retrieve video data where motion has been detected.

Figure 4:
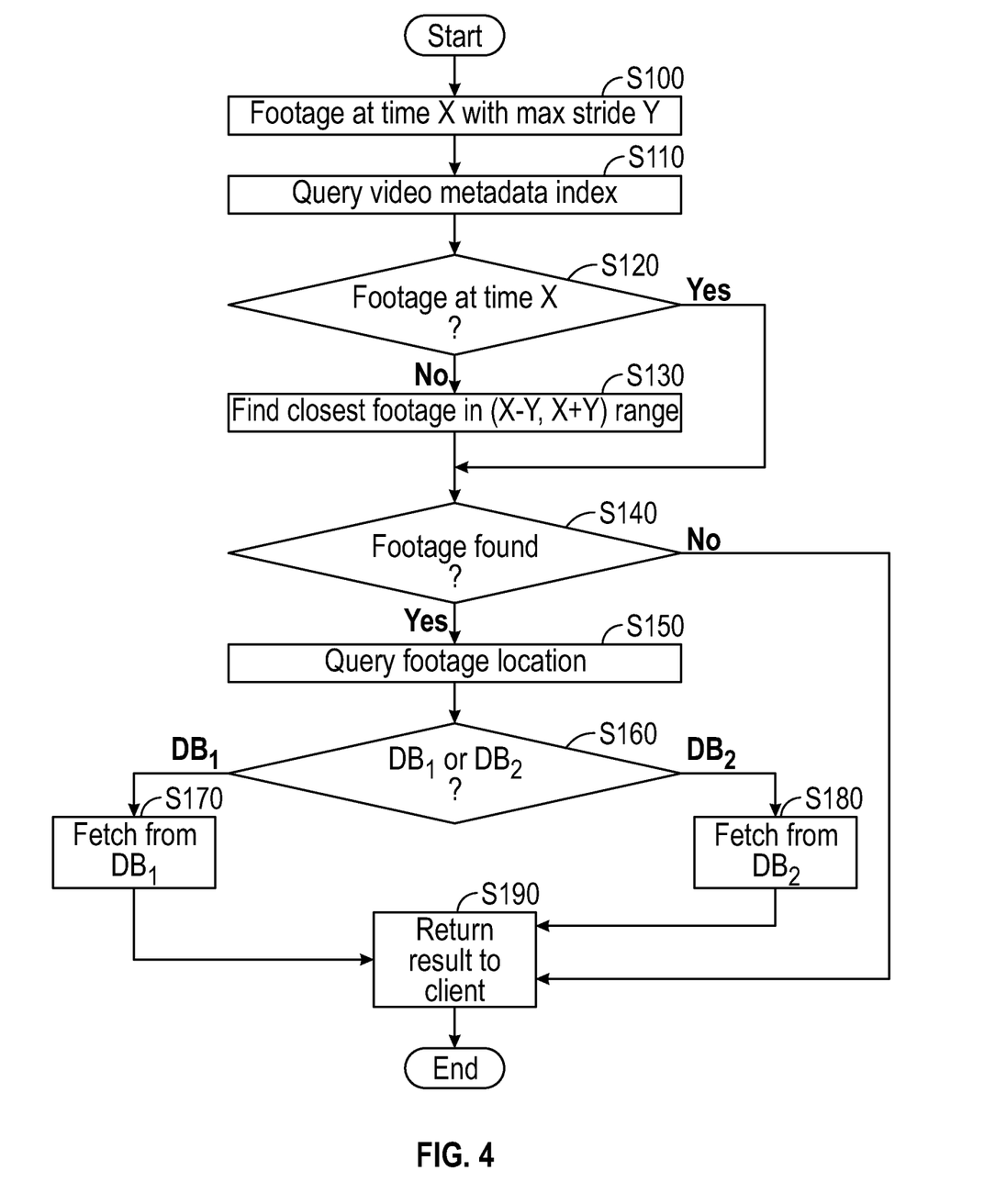
FIG. 4 is a flowchart illustrating a method for retrieving video data using a location based delivery method in accordance with a second embodiment of the present disclosure.

Referring now to FIG. 4, a flowchart illustrating various steps for retrieving video data to be delivered to a client based on a second embodiment of the present disclosure is shown. This second embodiment refers to a thumbnailing use case. The thumbnailing use case enables obtaining a thumbnail of the video data that is closest to a time request for video data requested by a client. The method initiates with step S100 of finding the video data at a time X with a max stride of Y. The client when requesting retrieval of video data sets the video data at time X with a max stride of Y. The max stride Y refers to range of time before and after the video data at time X. In step S110, the video management system 10 queries the video metadata service 40 to determine if there is video data at time X. In step S120, if it is determined that there is video data at time X, then the method continues to step S140. Alternatively, if it is determined in step S120, that there is no video data at time X, the method proceeds to step S130 to find the closest video data from time X within the max stride Y range. That is, video footage in the X−Y and X+Y range is searched. Next, in step S140 it is determined whether the video data is found. If the video data is found, the method proceeds to step S150 to query video data location. In step S160 it is determined whether the video data is located in DB$_1$ or DB$_2$. If it is determined that the video data is located in DB$_1$, then the video data is retrieved from DB$_1$ in step S170. Alternatively, if it is determined that the video data is located in DB$_2$, then the video data is retrieved from DB$_2$ in step S180. Then the video data result is transmitted to the client in step S190. If in step S140, no video data is found, the steps of querying the video data location and retrieving the video data from at least one database is skipped and a result that no video data was located is transmitted to the client.

Figure 5:
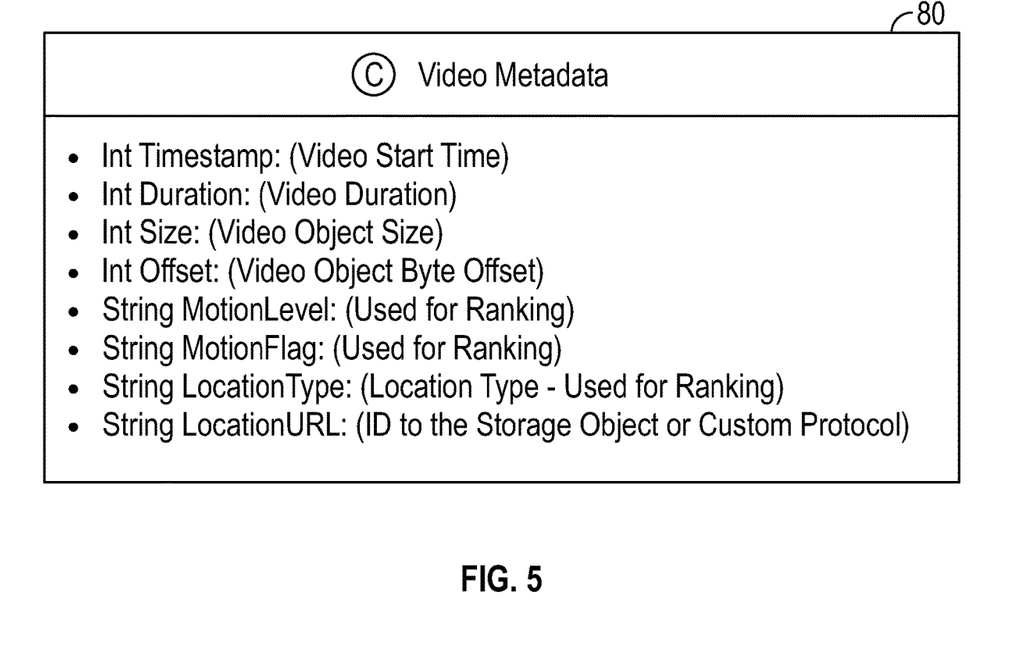
FIG. 5 is a diagram illustrating an exemplary video metadata data model in accordance with an embodiment of the present disclosure.

Referring now to FIG. 5, a diagram illustrating an example of video metadata 80 object that may be stored in the streaming service 20, media database 30 and/or video metadata service 40. FIG. 5 displays an exemplary video metadata 80 object. The video metadata is updated with the following information and emitted when the request is complete:
  Int Timestamp: (video start time)
  Int Duration: (video duration)
  Int Size: (video object size)
  Int Offset: (video object byte offset)
  string MotionLevel: (used for quality ranking)
  string MotionFlag: (used for quality ranking)
  string LocationType: (used for quality ranking)
  string LocationURL: (id to the storage object or custom protocol)

Not shown in FIG. 5 is another option that may be included in the metadata object and used for quality ranking such as MotionGrid. MotionGrid is similar to the MotionLevel. The MotionLevel refers to an amount of motion in an entire frame and assigns a value. MotionGrid divides the frame into a plurality of grids. For example, a 16×16 motion grid may divide one frame into 256 grids and a motion level value may be assigned for the individual grids to determine a motion level in a sub part of the frame instead of the entire frame.

The client may include a user requesting video data from a streaming service located on a server. The server including a video metadata service for indexing a group of pictures (GOP). The video data in this example is located in an object storage such as the cloud and/or customer storage device. The method of a location-based video data deliver may initiate by the user/client requesting video data with a start time and end time. The request may look like {starttime: "time1", endtime: "time2", intervals: 16} by way of example. The request for the video data is transmitted from the client to the streaming service located on the server. The streaming service transmits a POST/gop/indices to the video metadata service and the video metadata service returns video metadata information to the streaming service. Then the streaming service may request the video data from the object storage or the customer storage device or both depending on the video metadata information retrieved from the video metadata service. Upon receiving the video data, the data is then transmitted from the streaming service to the client. A marker is also transmitted from the streaming service to the client to signal that the transmission of the requested video data is complete. The streaming service, video metadata service and/or the server may be a part of the video management system 10 or in communication with the video management system 10.

Figure 6:
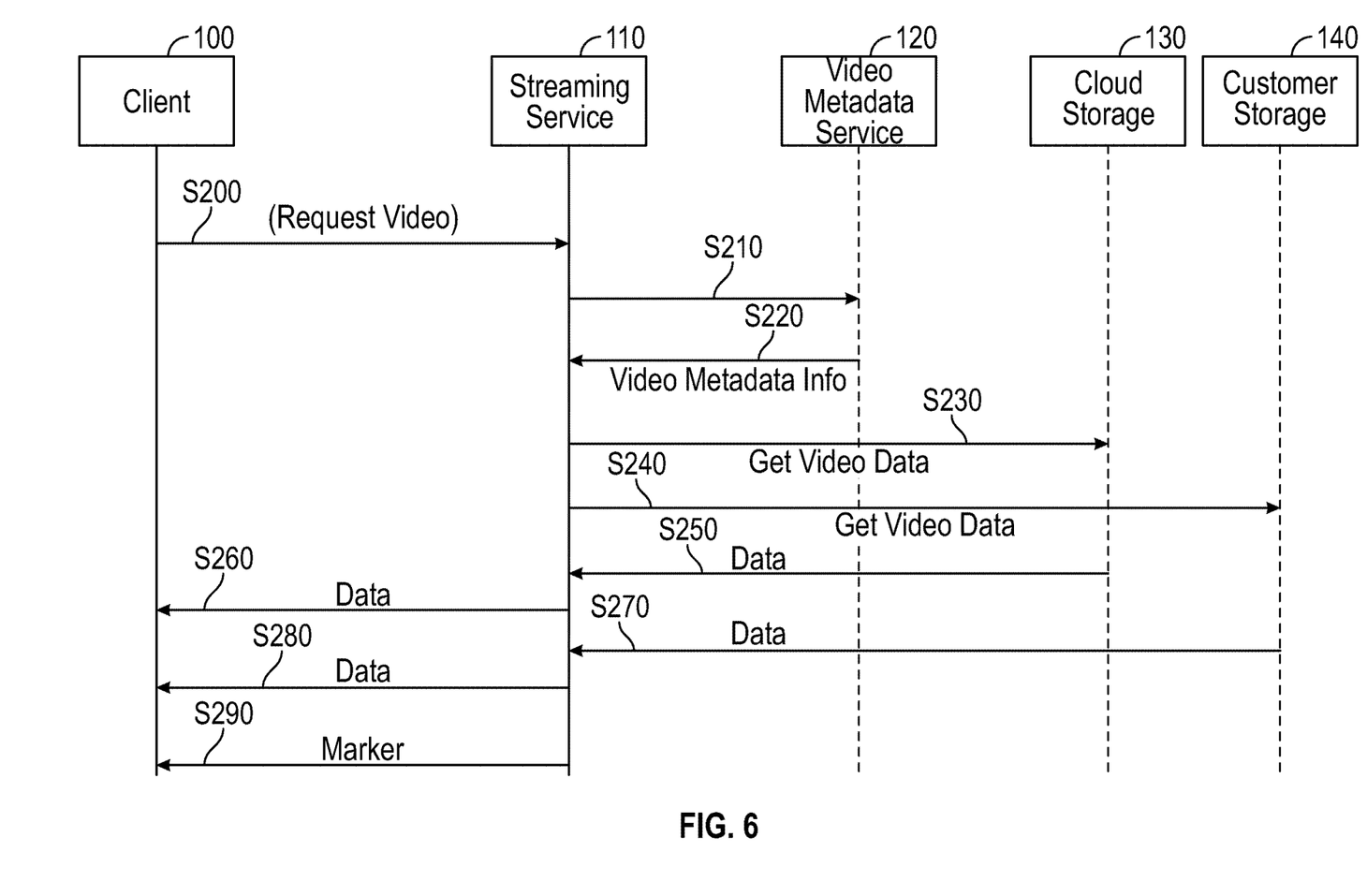
FIG. 6 is a diagram illustrating various transmissions between a client, a streaming service, video metadata service, object storage and customer storage for video metadata usage in accordance with an embodiment of the present disclosure.

Referring now to FIG. 6, a diagram illustrating the various steps of communication for retrieving video data from a cloud storage or customer storage. The client 100 initiates the process by transmitting a request for video in step S200 to the streaming service 110 associated with the video management system 10. Upon the streaming service 110 receiving the request, in step S210 a video metadata request associated with the request for video is transmitted from the streaming service 110 to a video metadata service 120 associated with the video management system 10. In step S220, the video metadata service 120 transmits the video metadata associated with the request for video to the streaming service 110. In step S230 a get video data request is transmitted from the streaming service 110 to the cloud storage 130. Similarly, in step S240 a get video data request is transmitted from the streaming service 110 to the customer storage 140. In this example, the streaming service 110 requests video data from both storage devices, however, in accordance with the present disclosure, a get video data request may be sent to only the storage device that is determined to have the most efficient path for retrieving the video data. The most efficient path may be determined on various factors including the steps described above in FIGS. 3 and 4. Subsequently, in step S250 the video data is transmitted from the cloud storage 130 to the streaming service 110 which then transmits the video data to the client 100 in step S260. In step S270, the video data is transmitted from the customer storage 140 to the streaming service 110. The streaming service 110 then transmits the video data to the client 100 in step S280. Upon completion of the video data being transmitted from the streaming service 110 to the client 100, the streaming service 110 transmits a marker to the client 100 in step S290 to signal to the client 100 that the video data from the request step in S200 has been completed.

Figure 7:
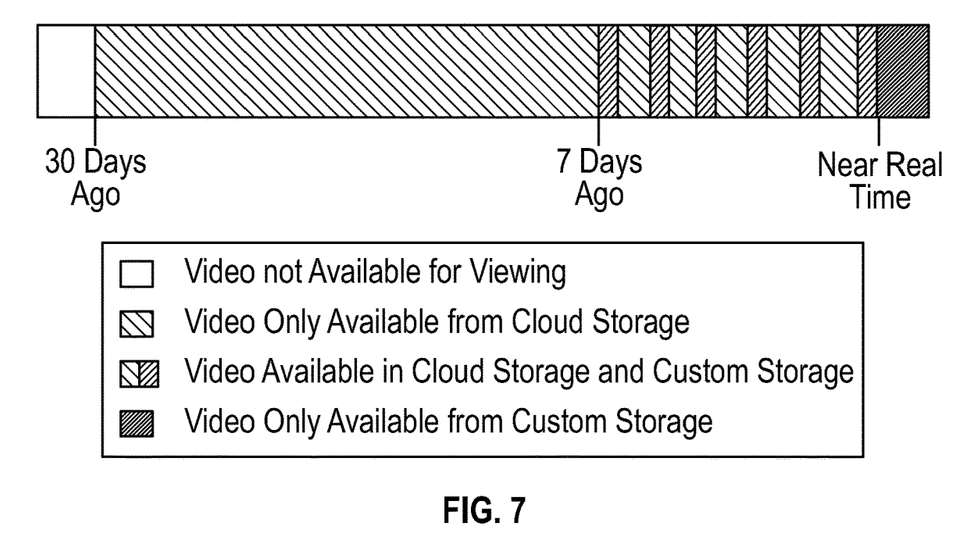
FIG. 7 is a diagram illustrating a video availability timeline in two different storage technologies in accordance with an embodiment of the present disclosure.

Referring now to FIG. 7, an exemplary timeline is illustrated and shows a preference for where to retrieve the video data from the storage devices. The timeline shows that the preference is to obtain the video data that is available from 30 days prior to 7 days prior from real-time from cloud storage only. The preference for the cloud storage may depend upon retention time. In other words, retention time refers to how long the video data is stored. Typically, the cloud storage option has longer retention times, so the further out from real-time that the data is requested, the more likely the data is available with the cloud storage option. The timeline portion between 7 days prior to real-time to near real-time the video data is available both in the cloud storage option and the customer storage option. Thus, in this timeline a determination should be made based on location of storage device, client preference or other factors as to which storage device the video data should be retrieved. Finally, the last portion of the timeline refers to a preference for obtaining video data from the customer storage option. This portion is closest to real-time so the retention issue is not a significant concern.

Figure 8:
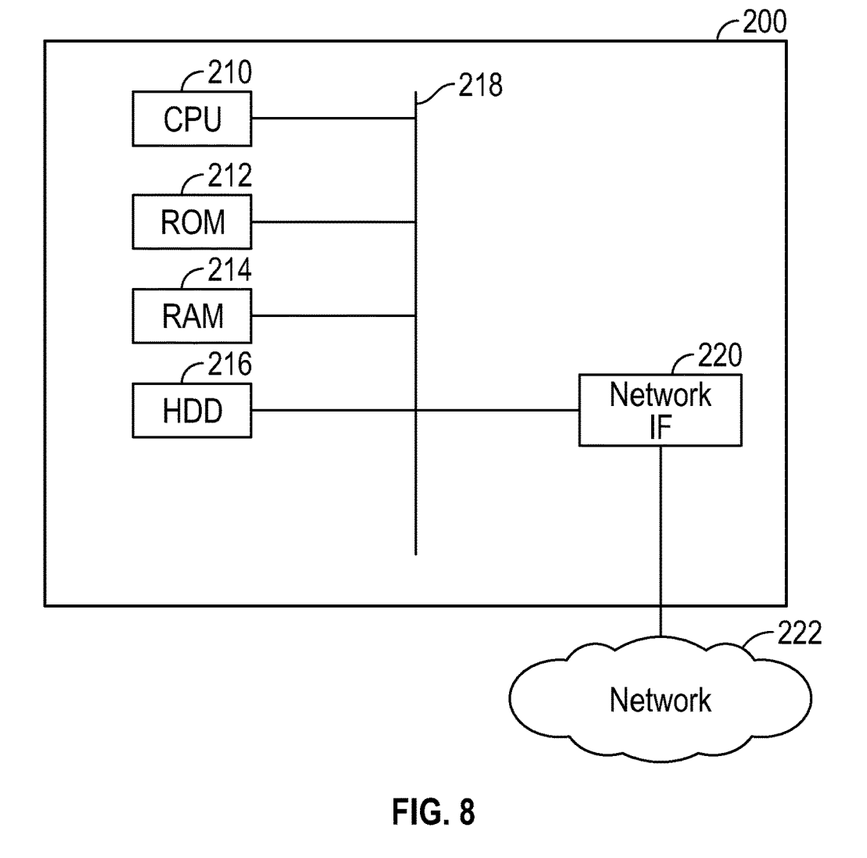
FIG. 8 illustrates an exemplary hardware configuration of the video management system, streaming service, video metadata service and/or media database in accordance with one or more aspects of the present disclosure.

FIG. 8 is an exemplary hardware configuration of the video management system 200 or a service associated or in communication with the video management system 200. The hardware configuration includes a CPU 210, a ROM 212, a RAM 214, an HDD 216, a system bus 218 and a network I/F 220. The CPU 210 controls operations of the entire apparatus by executing various types of processing by reading out a control program stored in the ROM 212. The CPU 210 is configured to execute the various steps required for requesting a location based video data delivery using the video management system 10. The RAM 214 is used as a main memory of the CPU 210, and a temporary storage region, such as a work area. The HDD 216 is a large-volume storage unit that stores image data and various programs. The system bus 218 is the method in which data is communicated between the CPU 210, ROM 212, RAM 214, HDD 216 and the network interface 220. The network I/F 220 is an interface that connects the video management system 10 to the network 222. The video management system 10 receives a processing request from another apparatus via the network I/F 220, and transmit/receive various types of information. The CPU 210 is configured to execute the various steps for a video indexing method.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation to encompass all such modifications and equivalent structures and functions.

What is claimed is:

1. A method for retrieving data and transmitting the data upon receiving a data request, wherein the data is from a video surveillance system and encoded into groups of pictures (GOPs), each group of pictures (GOP) being assigned at least one identifier and/or at least one timestamp, the method comprising:
   receiving the data request for the data from a client device, wherein the data request from the client device is associated with at least one identifier and/or at least one timestamp;
   retrieving a metadata object including a GOP and indicating at least two storage options where the data is retrievable, the metadata object being retrieved based on the at least one identifier and/or at least one timestamp associated with the data request;
   assigning a rank for both the data stored in a first storage option and the data stored in a second storage option;
   determining whether the data stored in the first storage option has a greater rank than the data stored in the second storage option;
   retrieving the data from the first storage option when it is determined that the first storage option has a greater rank and retrieving the data from the second storage option if the rank for the data stored in the first storage option is less than the rank for the data stored in the second storage option; and
   transmitting the data from a storage option with the greater rank to the client device.

2. The method according to claim 1, wherein the data is a video stream.

3. The method according to claim 2, wherein the video stream is from one camera associated with the video surveillance system.

4. The method according to claim 2, wherein the video stream is from a plurality of different cameras associated with the video surveillance system.

5. The method according to claim 1, wherein the first storage option is a cloud storage option and the second storage option is a client storage device.

6. The method according to claim 1, wherein the at least one identifier is a motion level associated with the data to be retrieved.

7. The method according to claim 1, wherein the rank determines a most efficient option for retrieving and transmitting the data to the client.

8. The method according to claim 1, wherein the rank is dependent on location of the data to be retrieved, the location of the data to be retrieved being determined by the metadata object.

9. The method according to claim 1, wherein the rank is dependent on motion level of the data to be retrieved, the motion level of the data to be retrieved being determined by the metadata object.

10. The method according to claim 9, wherein the motion level is a numeric value between 0-100, the motion level value is used to calculate motion triggers for recording as well as for searching through large amounts of video streams.

11. The method according to claim 1, further comprising a gateway device configured to connect to a plurality of different cameras on a local network, the gateway device converts raw video data from the plurality of different cameras on the local network into metadata objects with at least one identifier and/or at least one timestamp associated with each GOP.

12. The method according to claim 1, wherein a video byte offset is used to access a metadata object.

13. The method according to claim 11, wherein the gateway device is configured to associate the metadata objects with respective groups of pictures, based on matching identifiers and/or timestamps between the metadata objects and the respective groups of pictures.

14. An apparatus for retrieving data and efficiently transmitting the data upon receiving a client data request, wherein the data is from a video surveillance system and encoded into groups of pictures (GOPs), each group of pictures (GOP) being assigned at least one identifier and/or at least one timestamp, the apparatus comprising:
a memory that stores a program; and
at least one processor that executes the program stored in the memory to perform the following steps:

receiving the data request for the data from a client device, wherein the data request from the client device is associated with at least one identifier and/or at least one timestamp;
retrieving a metadata object including a GOP and indicating at least two storage options where the data is retrievable, the metadata object being retrieved based on the at least one identifier and/or at least one timestamp associated with the data request;
assigning a rank for both the data stored in a first storage option and for the data stored in a second storage option;
determining whether the data stored in the first storage option has a greater rank than the data stored in the second storage option;
retrieving the data from the first storage option when it is determined that the first storage option has a greater rank and retrieving the data from the second storage option if the rank for the data stored in the first storage option is less than the rank for the data stored in the second storage option; and
transmitting the data from a storage option with the greater rank to the client device.

15. A non-transitory computer-readable storage medium storing a program that, when executed by a computer, causes the computer to perform a method for retrieving data and efficiently transmitting the data upon receiving a data request, wherein the data is from a video surveillance system and encoded into groups of pictures (GOPs), each group of pictures (GOP) being assigned at least one identifier and/or at least one timestamp, the method comprising:
receiving the data request for the data from a client device, wherein the data request from the client device is associated with at least one identifier and/or at least one timestamp;
retrieving a metadata object including a GOP and indicating at least two storage options where the data is retrievable, the metadata object being retrieved based on the at least one identifier and/or at least one timestamp associated with the data request;
assigning a rank for both the data stored in a first storage option and the data stored in a second storage option;
determining whether the data stored in the first storage option has a greater rank than the data stored in the second storage option;
retrieving the data from the first storage option when it is determined that the first storage option has a greater rank and retrieving the data from the second storage option if the rank for the data stored in the first storage option is less than the rank for the data stored in the second storage option; and
transmitting the data from a storage option with the greater rank to the client device.

* * * * *